United States Patent [19]
Skeie

[11] Patent Number: 5,854,862
[45] Date of Patent: *Dec. 29, 1998

[54] LINEARIZED OPTIC MODULATOR WITH SEGMENTED ELECTRODES

[75] Inventor: Halvor Skeie, San Jose, Calif.

[73] Assignee: Crystal Technology, Inc., Palo Alto, Calif.

[*] Notice: This patent issued on a continued prosecution application filed under 37 CFR 1.53(d), and is subject to the twenty year patent term provisions of 35 U.S.C. 154(a)(2).

The term of this patent shall not extend beyond the expiration date of Pat. No. 5,671,302.

[21] Appl. No.: 865,532

[22] Filed: May 29, 1997

Related U.S. Application Data

[63] Continuation of Ser. No. 624,162, Mar. 29, 1996, Pat. No. 5,671,302.

[51] Int. Cl.$^6$ .................................................. G02F 1/01
[52] U.S. Cl. ............................................. 385/2; 385/40
[58] Field of Search ............................. 385/1–4, 8, 9, 385/40

[56] References Cited

U.S. PATENT DOCUMENTS

| | | | |
|---|---|---|---|
| 4,776,657 | 10/1988 | Reeder | 385/3 |
| 5,153,770 | 10/1992 | Harris | 385/2 X |
| 5,193,128 | 3/1993 | Farina et al. | 385/3 |
| 5,278,923 | 1/1994 | Nazarathy et al. | 385/3 |
| 5,291,565 | 3/1994 | Schaffner et al. | 385/3 |
| 5,671,302 | 9/1997 | Skeie | 385/2 |
| 5,675,673 | 10/1997 | Skeie | 385/2 |
| 5,696,855 | 12/1997 | Skeie | 385/2 |

FOREIGN PATENT DOCUMENTS 0 239 220 A   9/1987   European Pat. Off.

OTHER PUBLICATIONS

Integrated Optics and Microstructures II, San Diego, CA US 26–28, Jul. 1994, vol. 2291, Skeie H, "Optically Linearized Modulator for CATV Applications", 12 pp.

Journal of Lightwave Technology, Aug. 1990 USA, vol. 8, No. 8, pp. 1177–1186 Howerton MM et al., "Effect of Intrinsic Phase Mismatch on Linear Modulator Performance of the 1*2 Directional Coupler and Mac–Zehnder Interferometer".

Leos '94 Conference Proceedings, IEEE Lasers and Electro–Optics Society, 1994 7th Annual Meeting, Boston, MA, USA, Oct. 31–Nov. 3, 1994 pp. 278–279, vol. 2, Betts G E, et al "Optical Analog Link Using a Linearized Modulator".

*Primary Examiner*—John D. Lee

[57] ABSTRACT

A plurality of optic modulators implemented using segmented electrodes and nonparallel waveguide structures are cascaded using optical couplers to provide a linearization of the overall electro-optic transfer function. Each of the optical modulators which are coupled in cascade have an electrode structure which is divided into a plurality of relatively small segments. The segments are connected via bond wires and transmission lines on an adjoining microwave circuit board. Each of the optical modulators includes a pair of waveguides which are sloped so as to result in a nonparallel waveguide structure which reduces acoustic effects, e.g., ripple. By using a plurality of small segments to implement the electrode structure a high degree of sensitivity is achieved as compared to when a single lengthy electrode structure is used. The combination of the nonparallel waveguides and a segmented electrode provides for a relatively large flat frequency response, e.g., in excess of 1 GHz. The electrode structure is also designed to minimize the effective capacitance of the electrode structure to thereby broaden the bandwidth of the optic modulator of the present invention as compared to devices using solid center electrodes.

15 Claims, 8 Drawing Sheets

LINEARIZED OPTIC MODULATOR WITH SEGMENTED ELECTRODES

This is a continuation of application Ser. No. 08/624,162 filed Mar. 29, 1996 (now U.S. Pat. No. 5,671,302).

FIELD OF THE INVENTION

The present invention is directed to modulators, and more particularly, to integrated electro-optical modulators with sloped waveguides.

BACKGROUND OF THE INVENTION

Integrated electro-optical modulators are finding increasing use in optical-fiber communication systems. Such systems are being developed as an alternative to conventional electromagnetic transmission lines. Present optical-fiber communication systems may include, for example, a high power, low noise laser source in conjunction with a wide bandwidth external modulator.

There are already known various constructions of optic modulators. Among the known constructions are modulators which utilize interference between coherent light beams or portions originating at the same light source. Such modulators selectively phase-shift the light beams relative to one another, prior to being combined, in such a manner as to impose the desired intensity modulation onto the combined light beam.

In this context, it is to be mentioned that integrated optic intensity modulators that employ optical materials exhibiting the electro-optic effect, especially lithium niobate or lithium tantalate, offer many advantages and, consequently, are becoming increasingly important and popular in high-performance analog fiber optic links. Applications for such modulators include, but are not limited to, cable television, antenna remoting, and phased array radar.

A common problem in such systems is that the dynamic range thereof is limited by intermodulation distortion, and by harmonic distortion due to modulator nonlinearities.

Figure 1:
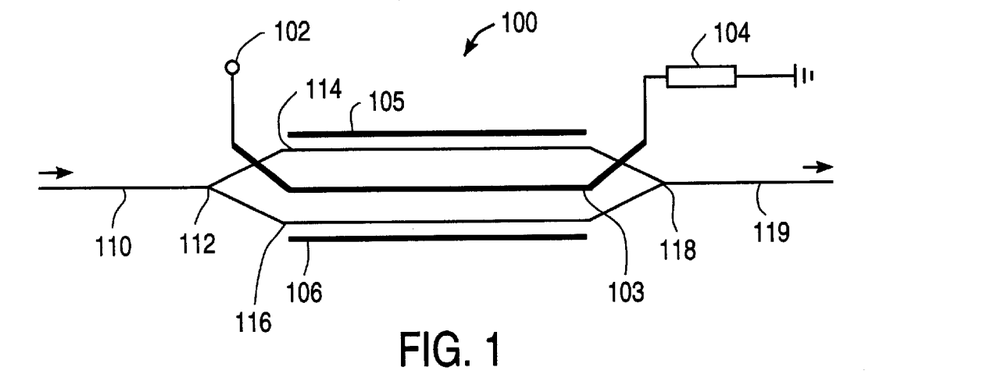
FIG. 1 is a pictorial diagram illustrating a known optical modulator implemented in a traveling wave configuration.

A first known modulator design, generally indicated by the reference numeral 100, is illustrated in FIG. 1. FIG. 1 illustrates what is known as a traveling wave configuration modulator. As illustrated the known traveling wave modulator comprises an incoming waveguide segment or channel 110, a Y input waveguide coupler 112, upper and lower waveguide segments 114, 116, a Y waveguide output coupler 118 and an output waveguide segment 119. Upper and lower outer electrodes 105, 106 are located parallel and in close proximity to the upper and lower waveguide segments 114, 116, respectively. A RF input 102 is coupled to a center electrode 103 which is positioned between the upper and lower waveguide segments 114, 116, respectively. The center electrode 103 is coupled to a terminating impedance 104, e.g., a 50 ohm resistor. The terminating impedance 104 is, in turn, coupled to ground.

In the traveling wave configuration, the modulating electronic signal travels collinearly with the light wave signal which enters through the input waveguide segment 110 and exits via the output waveguide segment 119. In such a design, only one well-defined input is possible to obtain best frequency response. The frequency response of the traveling wave configuration is limited by the characteristic impedance of the coplanar transmission line made up of the electrode structure and the difference in time delay between the microwave signal and the light wave signal as they propagate along the length of the electrode structure. In order to obtain a good match to the termination impedance and also to obtain a small differential delay, a dielectric buffer layer between the electrode and the substrate as well as very thick metallization are usually required. Long electrode structures are sometimes used to provide high modulation sensitivity. In modulators with such structures, depending on the properties of the buffer layer, thermal heating of the substrate can cause instability problems.

While the traveling waveguide modulator configuration offers some advantages over other designs, in terms of the bandwidths that can be achieved, it also has several disadvantages. In practice, a modulator implemented using a traveling wave configuration is subject to design constraints which make it difficult and awkward to implement. That is, it can be difficult to design a coplanar microwave transmission line with a characteristic RF impedance approaching 50 ohms. Accordingly, there is a need for a optical modulator that can support relatively large bandwidths, e.g., to 1 GHz and beyond, without the use of a traveling wave configuration.

Figure 2:
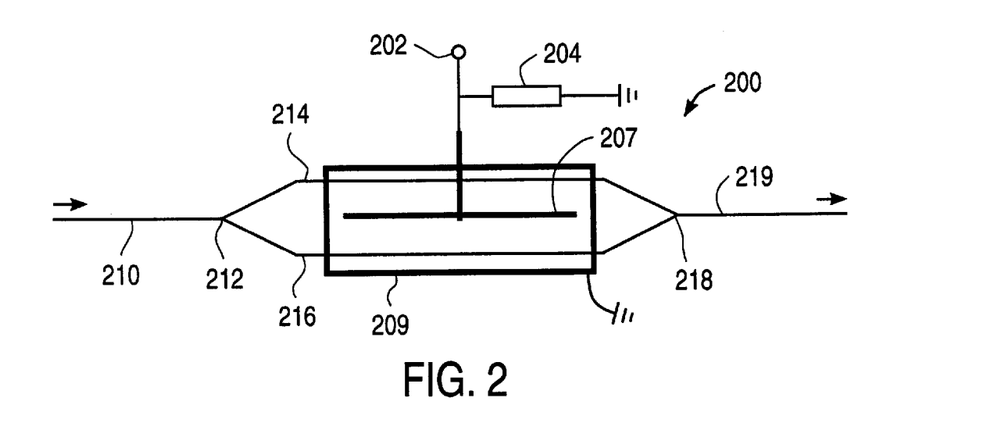
FIG. 2 is a pictorial diagram illustrating a known optical modulator implemented in a lumped element configuration.

Referring now to FIG. 2, there is illustrated another known optical modulator, i.e., a Mach-Zehnder intensity modulator generally indicated by the reference numeral 200. The optical modulator 200 comprises an input waveguide segment 210, an input Y-branch waveguide coupler 212, upper and lower waveguide segments 214, 216, an output Y-branch waveguide coupler 218 and an output waveguide segment 219. As illustrated a single center feed electrode 207, located between the waveguide segments 214, 216 is used as a driving electrode. A ground plane 209 surrounds the center electrode 207. Upper waveguide segment 214 is positioned between the center electrode 207 and an upper portion of the ground plane 209, while the lower waveguide segment 216 is positioned between the center electrode 207 and a lower portion of the ground plane 209.

As illustrated in FIG. 2, an RF input 202 is coupled to the center electrode 207 and to a terminating impedance 204. The terminating impedance 204, in turn, is coupled to ground.

The electrode arrangement illustrated in FIG. 2, illustrates a common approach to driving the electrode of an optical guided wave modulator. This approach involves the use of a single center electrode 207 surrounded by the ground plane 209 with the electrode 207 being center feed to minimize inductance and resistance. The electrode 207 exhibits essentially capacitive behavior over low RF drive frequencies, modified by interconnect inductance at higher frequencies. The internal resistance of an electronic RF drive signal source, combined with the capacitance of the electrode 207, defines an RC network which limits the frequency response of this type of modulator.

The lumped element modulator configuration illustrated in FIG. 2, has a typical cut off frequency of:

$$f_c = 1/(RC)$$

where C is the capacitance of the electrode structure and R is the resistance of the drive source, e.g., the resistance 204.

The smaller C is, the higher the upper frequency can be. A small value of C requires a short electrode interaction length which reduces the sensitivity of the modulator. Also, stray capacitance and inductance of connecting bondwires will limit the practical high frequency performance.

With the increasing demands for optic modulators with ever larger bandwidths, there is a need for new optic modulators with smaller capacitance values that are capable of supporting the higher bandwidths required.

The optical materials constituting the waveguides and the remainder of the substrate and/or the electrodes are capable of not only conducting but also producing acoustic waves including those which are generated as a result of the application of the different electric fields to the parallel electrodes 209. Such acoustic action and interaction results in ripples or fine structure that adversely effect the frequency response of the modulator 200.

Many attempts have been made in the art to improve the frequency characteristics and linearity of lumped electrode type modulators.

U.S. Pat. No. 5,193,128 to Farina, describes the use of waveguides which are separated from one another by a traverse distance that gradually varies along the course of the waveguides in an optical modulator which uses a solid center electrode. The use of such sloped waveguides reduces and/or spreads the noise distortion in the optical output signal to affect various light frequencies within the frequency range of interest in a much more uniform manner than when two parallel waveguides are used. This has the effect of reducing if not eliminating the noise distortion of the optical output signal that is attributable to the effect of the acoustic waves generated during the operation of the modulator to provide a flatter frequency response than would be possible without the use of sloped waveguides.

Figure 3:
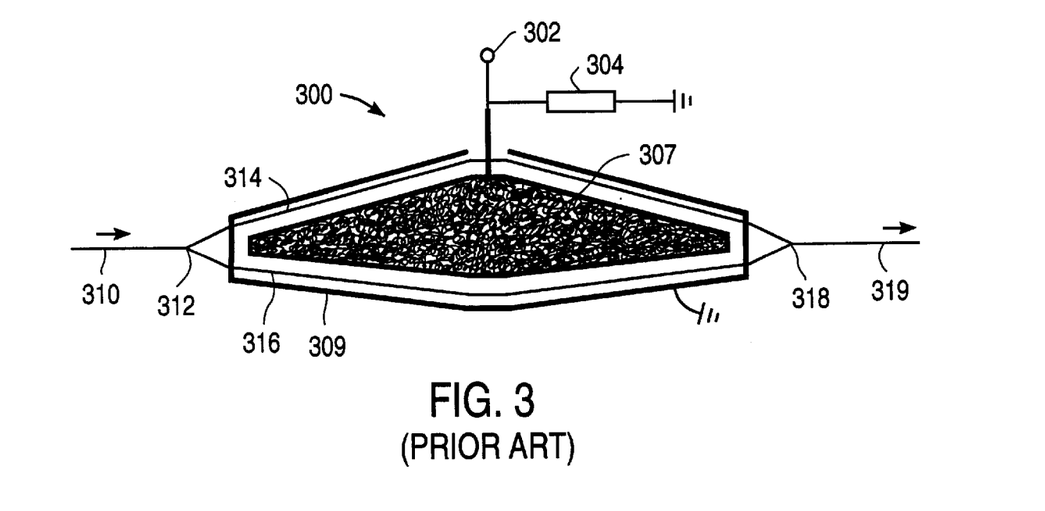
FIG. 3 is a pictorial diagram illustrating a known optical modulator including sloped waveguides and a solid center electrode implemented in a lumped element configuration.

Referring now to FIG. 3, there is illustrated a known lumped electrode type optical modulator 300 with sloped waveguides which reduce the acoustic effects and thus the amount of ripple in the light output signal. The optical modulator 300 comprises an input waveguide segment 310, an input Y-branch waveguide coupler 312, upper and lower continuously sloping waveguide segments 314, 316, respectively, an output Y-branch waveguide coupler 318 and an output waveguide segment 319. As illustrated, a single solid center electrode 307 is positioned between the waveguide segments 314, 316. The solid center electrode 307 is used as a driving electrode. A ground plane 309 surrounds the center electrode 307. Upper waveguide segment 314 is positioned between the center electrode 307 and an upper portion of the ground plane 309, while the lower waveguide segment 316 is positioned between the center electrode 307 and a lower portion of the ground plane 309.

As illustrated in FIG. 3, an RF input 302 is coupled to the center electrode 307 and to a terminating impedance 304. The terminating impedance 304, in turn, is coupled to ground.

While the above described known approaches to implementing optical waveguide modulators have proved successful to some extent, given modern requirements for ever larger bandwidths, there is a need for improved optical waveguide modulators which can support larger bandwidths than is possible using the known lumped electrode type modulators. Furthermore, it is desirable that the optical waveguide modulators have a generally flat frequency response and a linearized output. It is also desirable that the modulators be capable of being implemented without the use of a traveling wave configuration.

SUMMARY OF THE PRESENT INVENTION

The present invention is directed to modulators, and more particularly, to the linearization of the light generated by integrated electro-optical modulators.

In accordance with one exemplary embodiment of the present invention, a plurality of optic modulators implemented using segmented electrodes and nonparallel waveguide structures are cascaded using optical couplers to provide a linearization of the overall electro-optic transfer function. Each of the optical modulators which are coupled in cascade have an electrode structure which is divided into a plurality of relatively small segments. The segments are connected via bond wires and transmission lines on an adjoining microwave circuit board. Each of the optical modulators includes a pair of waveguides which are sloped so as to result in a nonparallel waveguide structure which reduces acoustic effects, e.g., ripple. By using a plurality of small segments to implement the electrode structure a high degree of sensitivity is achieved as compared to when a single lengthy electrode structure is used. The combination of the non-parallel waveguides and a segmented electrode provides for a relatively large flat frequency response, e.g., in excess of 1 GHz. The electrode structure is also designed to minimize the effective capacitance of the electrode structure to thereby broaden the bandwidth of the optic modulator of the present invention as compared to devices using solid electrodes.

Additional features and embodiments of the present invention are described in the detailed description that follows.

DETAILED DESCRIPTION

Figure 4:
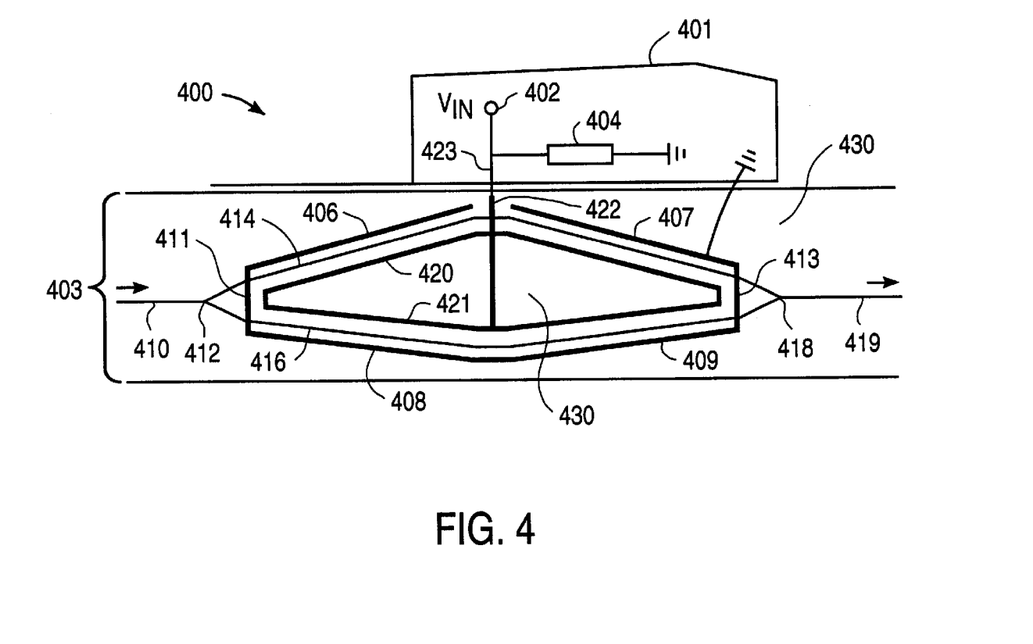
FIG. 4 is a pictorial diagram illustrating an optical modulator including a multiplate center electrode implemented in accordance with one embodiment of the present invention.

Referring now to FIG. 4, there is illustrated an optic modulator 400 implemented in accordance with a first embodiment of the present invention. As illustrated, the optic modulator 400 comprises a waveguide and electrode structure 403 implemented on a substrate 430, and an RF input terminal 402 and impedance 404 which are located on a printed circuit board 401. The substrate 430 may be, e.g., lithium niobate crystal or a similar optic material that is conductive to light and has both electro-optic and piezoelectric properties.

The waveguide and electrode structure 403 comprises an input waveguide segment 410, a first Y-branch waveguide coupler 412, upper and lower sloping waveguide segments 414, 416, a second Y-branch waveguide coupler 418, and an output waveguide segment 419.

During operation, an input light wave typically having a power level expressed in milliwatts is applied to the input waveguide segment 410, for carrying the light wave to be divided into upper waveguide segment 414 and lower waveguide segment 416 by the first Y-branch waveguide coupler 412. The light wave traveling through the upper waveguide segment 414 travels through an upper branch of the second Y-branch waveguide coupler 418 and through the output waveguide segment 419 to provide a light wave output. Similarly, the light wave traveling through the lower waveguide segment 416 travels through a lower branch of the second Y-branch waveguide segment 418 and through the output waveguide segment 419. Note that waveguide segments 410, 412, 414, 418 and 419 form a continuous waveguide, as do waveguide segments 410, 412, 416, 418, 419.

As illustrated in FIG. 4, a pair of relatively narrow elongated upper outer electrodes 406, 407 are positioned relatively close to the top of the upper longitudinal waveguide segment 414 and are shaped to follow the sloping contour of the waveguide segment 414. Similarly, a pair of narrow elongated lower outer electrodes 408, 409 are positioned relatively close to the bottom of the lower longitudinal waveguide segment 416 and are shaped to follow the sloping contour of the waveguide segment 416.

A pair of narrow elongated upper and lower center electrodes 420, 421, are positioned relatively close to the bottom of the upper longitudinal waveguide segment 414 and the top of the lower longitudinal waveguide segment 416. Electrodes 420, 421 are shaped to follow the sloping contour of the waveguide segments 414, 416, respectively. An electrode segment 422 is used to couple the upper and lower center electrodes 420, 421 together. As illustrated, the portion of the center electrodes 420, 421 which are not coupled together by the electrode segment 422 are separated from each other by a portion of the substrate material 430. The electrode segment 422 is coupled to the input terminal 402. In this manner, a modulating or instantaneous voltage V(t) is connected to electrode segments 422, 420, 421. A DC bias voltage may also be connected to electrode segments 422, 420, 421. A terminating impedance 404, located on the printed circuit board 401, is coupled to the input terminal 402 and to ground.

The upper and lower outer electrode pairs (406, 407), (408, 409), respectively, are each connected to a source of reference potential, ground in this example. In the illustrated embodiment, electrode segments 411, 413 connect the upper and lower outer electrode pairs together to insure that they are at the same reference potential.

The waveguide and electrode elements may be formed on the substrate 430 with the waveguide segments being formed by, e.g., diffusing titanium into the substrate 430 and the electrodes may be formed by, e.g., depositing a conductor on the substrate.

The light wave signal applied to the input waveguide segment 410 is substantially equally divided by the first Y-branch waveguide coupler 412. Thus, one half portion travels though the upper waveguide segment 414 and another one half portion through the lower waveguide segment 416. Light traveling through the upper waveguide segment 414 passes between the upper outer electrode pair 406, 407 and the upper inner electrode segment 420. Light traveling through the lower waveguide segment 416 passes between the lower outer electrode pair 408, 409 and the lower inner electrode segment 421. The modulating voltage V(t) causes the index of refraction of the substrate 430 to change. This results in a change in the speed of the light passing through the upper and lower waveguide segments. The change in the speed in the upper waveguide segment 414 is opposite the change in speed which occurs in the lower waveguide segment 416. Accordingly, if the speed in the upper waveguide segment increases in response to a change in V(t), the speed in the lower waveguide segment will decrease in response to the same change in V(t).

The phase difference created between the light traveling though the upper waveguide segment 414 and the lower waveguide segment 416 modulates the light. The light from the upper waveguide segment 414 and the lower waveguide coupler 416 pass through the second Y-branch waveguide segment 418 and are combined together to form the modulated light signal output by the output waveguide segment 419. The modulated light output signal includes only the in-phase components of the modulated light since, in this example, the second Y-branch waveguide coupler 418 serves as a modulator which absorbs, into the substrate 430, components of the modulated light that are in phase quadrature.

As will be apparent to one of ordinary skill in the art, the optic modulator 400 may be characterized as a lumped element electrode type of modulator which includes sloped waveguides to reduce acoustic effects, e.g., ripple, on the quality of the modulated light. As discussed above, the cutoff frequency of this type of modulator is determined by the equation:

$$f_c = 1/(RC)$$

where C is the capacitance of the entire electrode structure and R is the resistance of the drive source, e.g., the resistance 404.

As is apparent from a comparison of the electrode structures illustrated in FIGS. 3 and 4, the embodiment of the present invention illustrated in FIG. 4 uses what may be characterized as a multiplate center electrode structure comprising electrode segments 420, 421 and 422 as opposed to the solid center electrode structure found in the known devices.

By implementing the center electrode structure in such a manner, the capacitance effect is reduced. This reduces the overall capacitance C of the entire electrode structure of the modulator 400. By using a multiplate center electrode assembly as opposed to a solid center electrode, a reduction of the overall capacitance C may be achieved with little or no adverse impact on the ability to modulate the light wave signal being passed through the optical modulator 400.

Accordingly, the multiplate center electrode assembly of the present invention permits higher frequency signals to be modulated than would be possible using a similar optical modulator having a solid center electrode. Thus, in accordance with one embodiment of the present invention, multiplate center electrodes are used to produce modulators with larger bandwidths than one possible with similar modulators using solid center electrodes.

Figure 5:
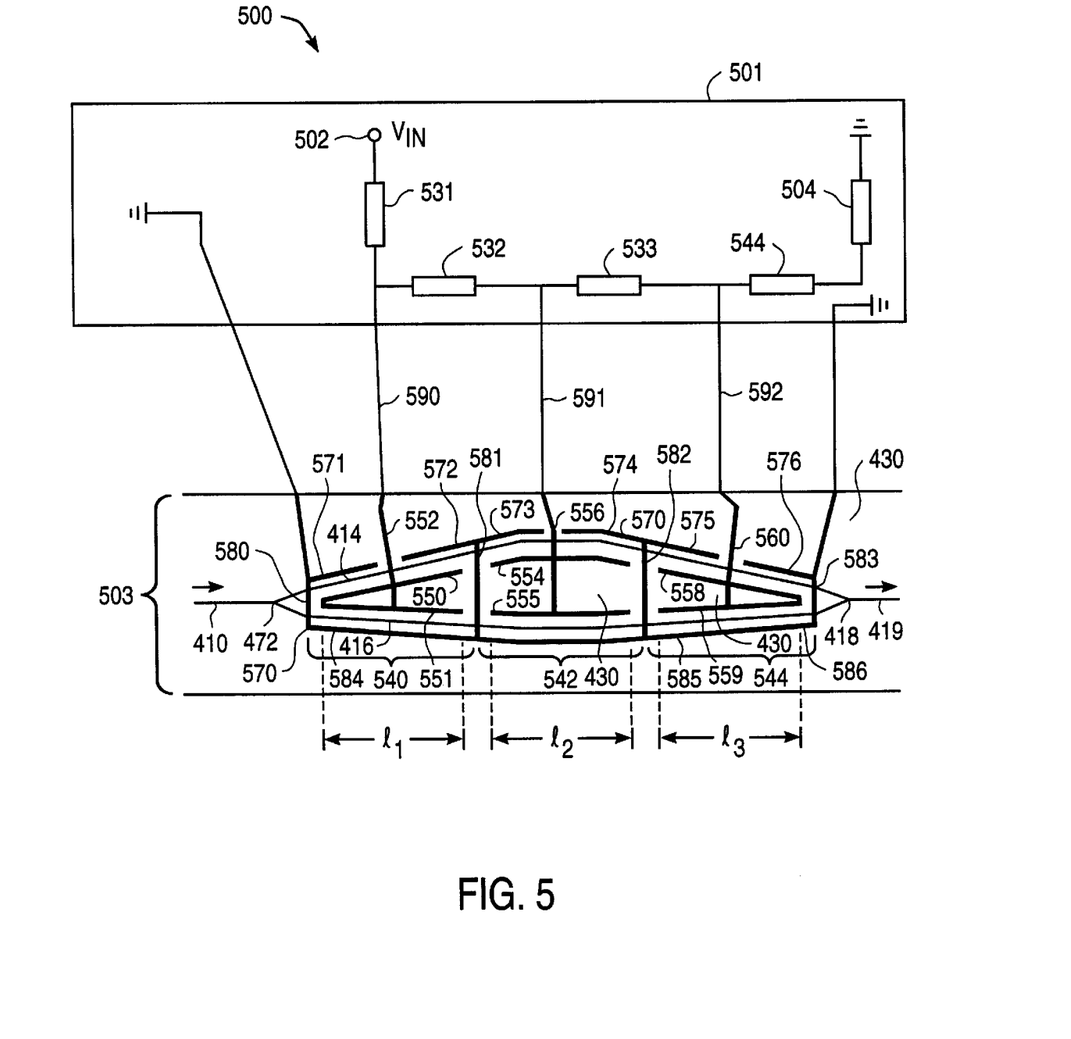
FIGS. 5 through 7 are pictorial diagrams illustrating various optical modulators including sloped optical waveguides and multisegmented electrodes implemented in accordance with various embodiments of the present invention.

An optic modulator 500 implemented in accordance with another embodiment of the present invention is illustrated in FIG. 5. Elements that are the same as or similar to those of FIG. 4 are identified using the same reference numbers as used in FIG. 4 and will not be described again in detail for the sake of brevity.

Referring now to FIG. 5, it can be seen that the optic modulator 500 comprises a printed circuit board 501. It also comprises a waveguide and electrode assembly 503 implemented on a substrate 430. Unlike the previously described optic modulators, the optic modulator 500 uses an electrode structure which comprises a plurality of individual electrode segments 540, 542, 544. It also uses sloped waveguides to reduce acoustic effects and, in the illustrated embodiment, multiplate center electrodes to minimize the effective capacitance. Accordingly, the waveguide and electrode assembly 503 may be described as an optic modulator having sloped waveguides and a segmented electrode.

Each electrode segment 540, 542, 544, is defined by an area or compartment formed by an outer electrode 570. As illustrated in FIG. 5, a series of relatively narrow elongated upper outer electrode segments 571, 572, 573, 574, 575, 576 form the upper portion of the outer electrode 570. The upper portion of the outer electrode 570 is positioned relatively close to the top of the upper longitudinal waveguide segment 414 and is shaped to follow the sloping contour of the waveguide segment 414. A lower portion of the outer electrode 570 is formed by a series of relatively narrow elongated lower outer electrode segments 584, 585, 586. The lower portion of the outer electrode 570 is positioned relatively close to the bottom of the lower longitudinal waveguide segment 416 and is shaped to follow the sloping contour of the waveguide segment 416.

Front and rear side segments 580, 583 and partition segments 581, 582 in combination with the upper and lower segments of the electrode 570 define the electrode segments 540, 542, 544.

The first electrode segment 540 is defined by outer electrode segments 571, 572, 581, 584 and 580. The second electrode segment 542 is defined by outer electrode segments 573, 574, 582, 585, and 581. The third electrode segment 544 is defined by outer electrode segments 575, 576, 583, 586 and 582.

Each electrode segment 540, 542, 544 includes a multi-plate center electrode assembly. The center electrode assembly of the first electrode segment 540 comprises a first pair of narrow elongated upper and lower center electrodes 550, 551 that are positioned close to the bottom of the upper longitudinal waveguide segment 414 and the top of the lower longitudinal waveguide segment 416. The electrodes 550, 551 are shaped to follow the sloping contour of the waveguide segments 414, 416, respectively. A coupling electrode segment 552 is used to couple the upper and lower center electrodes 550, 551 to each other and to a first lead 590.

The center electrode assemblies of the second and third electrode segments 542, 544 are implemented in a manner that is similar to that of the center electrode assembly of the first electrode segment 540. The center electrode assemblies of the second and third electrode segments 542, 544 comprise a first pair of narrow elongated upper and lower center electrodes (554, 555) (558, 559). The upper center electrodes 554, 558 are positioned close to the bottom of the upper longitudinal waveguide segment 414 while lower center electrodes 555, 559 are positioned close to the top of the lower longitudinal waveguide segment 416, respectively. The electrodes (554, 558), (555, 559) are shaped to follow the sloping contour of the waveguide segments 414, 416, respectively. A coupling electrode segment 556, 576 is used to couple the electrodes (554, 555), (558, 559) of the upper and lower center electrode pairs to each other and to second and third leads 591, 592, respectively.

As discussed above, the center electrode design of the present invention referred to herein as a multi-plate design provides for a lower capacitance than when a solid center electrode is used. However, it should be noted that the embodiment of the present invention illustrated in FIG. 5, may be implemented using either solid or multiplate center electrodes.

As illustrated, the outer electrode 570 is coupled to a reference potential, e.g., ground in the embodiment illustrated in FIG. 5.

Each of the first through third leads 590, 591, 592 is coupled to a corresponding modulating voltage source located on the printed circuit board 501. As illustrated in FIG. 5, the printed circuit board 501 comprises an RF input terminal 502 which is coupled to a first inductor 531 having an inductance of L/2 where L is a positive number. Accordingly, the output side of the first inductor serves as the source of the voltage used to modulate the center electrode assembly of the first electrode segment 540. The inductor 531, in turn, is coupled to the first lead 590 and to a second inductor 532 having an inductance of L. The output of the second inductor 532 is coupled to the lead 591 and to a third inductor 533 having an inductance of L. Accordingly, the output side of the second inductor 532 serves as the source of voltage used to modulate the center electrode assembly of the second electrode segment 542.

The third inductor 533 has an output coupled to the third lead 592 and an input of the fourth inductor 544. The fourth inductor 544 has an inductance of L/2 and, in turn, is coupled to a terminating impedance 504. The terminating impedance 504 is coupled to ground as is the outer electrode 570 of the waveguide and modulator structure 503.

As discussed above, the modulator 500 of the present invention utilizes sloped waveguides and a segmented electrode configuration to provide an optical modulator with a large bandwidth and a relatively flat frequency response. The modulator 500 has the advantage that it achieves this highly desirable result without the need for a complicated buffer layer and/or thick film metallization technology. In addition to having a large bandwidth and flat frequency response the modulator 500 of the present invention also has the advantage of having a high modulation sensitivity.

In the segmented electrode embodiment of FIG. 5, the complete electrode structure is divided into multiple lumped element segments 540, 542, 544. Electrically, the optic modulator 500 acts as a low pass ladder network where each of the first through third electrode segments 540, 542, 544 have interaction lengths $l_1$, $l_2$, and $l_3$, respectively, and a capacitance of C. In the illustrated embodiment, the electrode segments 540, 542, 544 are designed so that $l_1$, $l_2$, $l_3$ are all the same length, l. The first through third electrode segments 540, 542, 543 are connected with an effective inductance of L and terminated into the impedance 505, e.g. a load resistor having a resistance of R. For optimal matching, R should be close to the external impedance, e.g., usually 50 ohms, and the following equation should also be satisfied:

$$R = sqrt(L/C)$$

The principle cut off frequency of the segmented electrode modulator 500 will be:

$$f_c = 1/(RC)$$

which is the same as for a single element, while the sensitivity is proportional to (n times l) where n is the number of electrode segments 540, 542, 544. Accordingly, the sensitivity of the segmented electrode optic modulator is increased as compared to a single electrode embodiment, by a factor equal to the number of electrode segments 540, 542, 544, e.g., 3 in the case of the embodiment illustrated in FIG. 5. While 3 electrode segments are used, it is to be understood that any number of n segments may be used.

It should be noted that the optical modulation response of the segmented electrode modulator 500 does not necessarily follow the matching response given by the equivalent low pass filter response. The optical response is also restricted by the difference in delay of the electronic signal as compared to the light wave signal between the first electrode segment 540 and the last electrode segment 544. This characteristic of the segmented electrode modulator 500 is similar to that of modulators implemented using a traveling wave configuration.

The critical frequency for a segmented electrode modulator is:

$$f_{cd} = [1/(RC)] \times [1/[(n-1)(1-a)]]$$

where $$a = l_t/(c_l RC)$$

and $l_t$ = effective total interactive electrode length
   = $l_1 + l_2 + l_3$, $C_l$=light wave velocity in the waveguide; a is also approximately given by:

$$a \sim c_e Z_e/(c_l Rk)$$

where:
   $c_e$=microwave velocity along the electrode structure;
   $z_e$=characteristic impedance of an equivalent coplanar transmission line; and
   k=(n-1)l/l$_t$=electrode "fill factor".

For proper operation of the optic modulator 500, it is hence required that:

$$f_{cd} >= f_c.$$

By utilizing sloped waveguides in combination with a segmented electrode, the optic modulator 500 of the present invention offers the advantages of a broad, flat frequency response with a minimum ripple due to acoustic effects.

Figure 6:
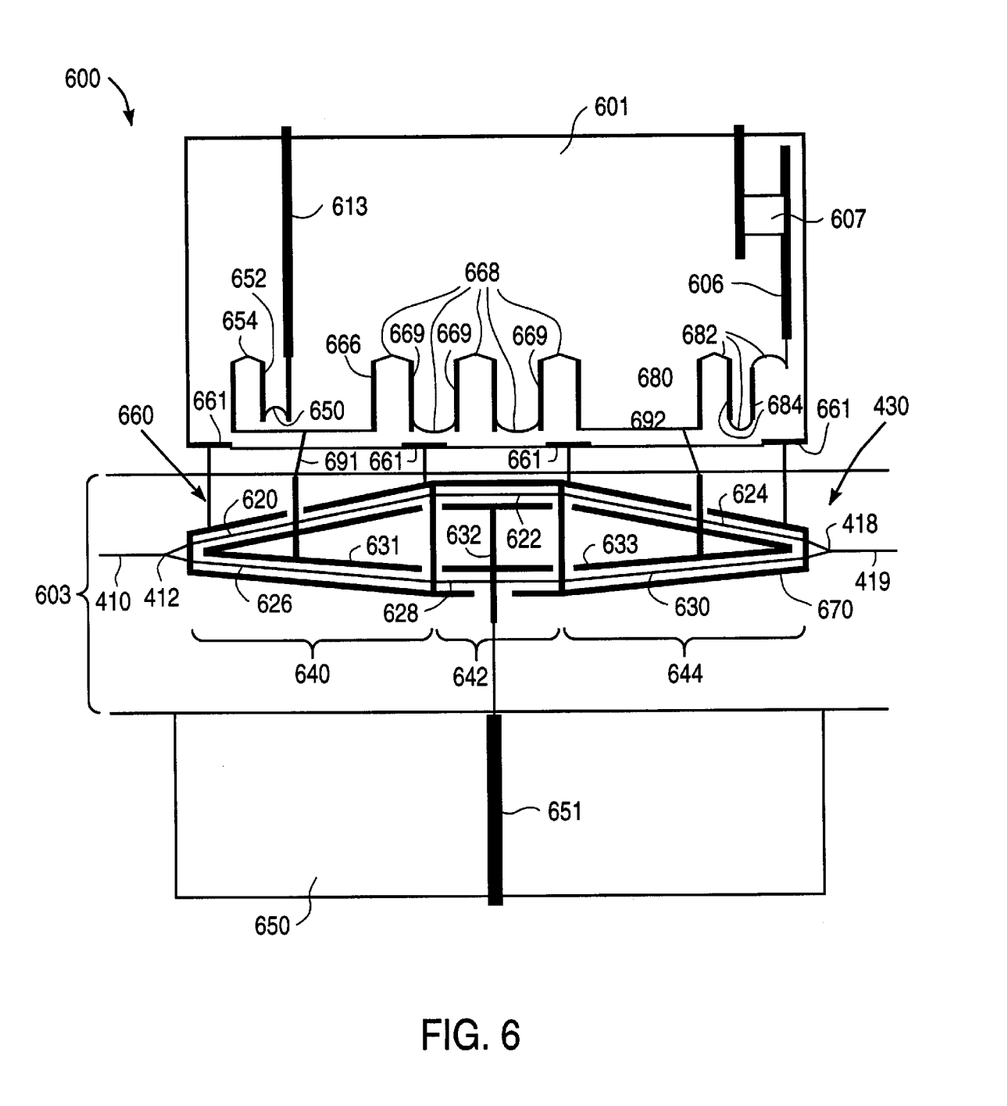

An optic modulator 600 implemented in accordance with another embodiment of the present invention using sloped waveguides and a segmented electrode is illustrated in FIG. 6. Elements of the optic modulator 600 which are the same as, or similar to those of FIG. 5, are identified using the same reference numbers and will not be described again in detail.

Referring now to FIG. 6, it can be seen that the optic modulator 600 comprises a first printed circuit board 601, a second printed circuit board 650, and a waveguide and electrode assembly 603. The waveguide and electrode assembly is 603 implemented on the substrate 430. The first printed circuit board 601 is an RF matching circuit board which supplies modulating voltage signals to the waveguide and electrode assembly 603.

The first printed circuit board 601 includes an RF input transmission line 613, a plurality of bond wires 650, 654, 668, 682, a plurality of high impedance transmission line stubs 652, 666, 669, 680, 684, an RF output transmission line 606, a chip resistor 607 for matched termination of the RF output transmission line 606 and a plurality of ground terminals 661. As illustrated in FIG. 6, the RF input transmission line 613 is coupled by the bondwires 650, 654 and the first high impedance transmission line stub 652 to the second high impedance transmission line stub 666. A bondwire 691 couples the second high impedance transmission line stub 666 to a center electrode assembly of a first electrode segment 640 on the substrate 430.

Bondwires 668 and high impedance transmission line stubs 669 couple the second high impedance transmission line stub 666 to high impedance transmission line stub 680. A bondwire 692 couples the transmission line stub 680 to a third center electrode assembly 633. Bondwires 682 and high impedance transmission stubs 684 couple transmission stub 680 to the RF output transmission line 606. The RF output transmission line 606, in turn, is coupled to the chip resistor 607 for matched termination of the RF output transmission line.

The second printed circuit board 650 is a DC (direct current) bias circuit board which comprises a DC bias transmission line 651. The DC bias transmission line 651 is coupled to a second center electrode assembly 632 located on the substrate 430.

The waveguide and electrode assembly 603 comprises two RF or modulating electrodes segments 640, 644 which are located around a bias electrode segment 642. The first and second modulating electrode segments 640, 644 and the bias electrode segment 642 are formed by compartments created by an outer electrode 670. The outer electrode 670 is coupled to ground 661 by a bondwire 660. The first multiplate center electrode assembly 631 is located inside the first electrode segment 640, the second multiplate electrode assembly 632 is located inside the bias electrode segment 642 and the third multiplate center electrode assembly 633 is located inside the second modulating electrode segment 644.

The waveguides of the waveguide and electrode assembly 603 are made up of a plurality of waveguide segments including an input waveguide segment 410, a first Y waveguide coupler 412, an upper longitudinal waveguide path, a lower longitudinal waveguide path, a second Y waveguide coupler 418 and an output waveguide segment 419. The upper longitudinal waveguide path includes a first sloped upper waveguide segment 620, a generally straight upper waveguide segment 622 and a second sloped upper waveguide segment 624. Similarly, the lower longitudinal waveguide path includes a first sloped lower waveguide segment 626, a generally straight lower waveguide segment 628 and a second sloped waveguide segment 630. The first and second upper and lower sloped waveguide segments 620, 624, 626, 630 are symmetrically located around the straight upper and lower waveguide segments 622, 628.

Since the bias signal introduced by the bias electrode segment 642 does not produce acoustic signals that result in ripple, e.g., the way an RF modulating signal does, there is no need for the waveguides passing through the bias electrode segment 642 to be sloped. Accordingly, in the embodiment illustrated in FIG. 6, only the waveguides and electrode segments in the first and second RF modulating electrode segments 640, 644 are sloped.

The optic modulator illustrated in FIG. 6 has similar advantages in terms of bandwidth and flat frequency response to the modulator illustrated in FIG. 5. However, the optic modulator 600 illustrated in FIG. 6 has the additional advantage of permitting a DC bias level to be adjusted as may be required by applying a bias voltage to the center electrode assembly 632 of the DC bias electrode segment 642.

The use of high impedance microwave transmission line stubs in the embodiment of FIG. 6 for external matching rather than discrete inductors provides more reliable high frequency operation as well as ease and reproducibility of fabrication than does the use of discrete inductors as illustrated in FIG. 5. The effective inductance may be adjusted by the length and position of the bondwires used to connect the transmission line stubs.

Figure 7:
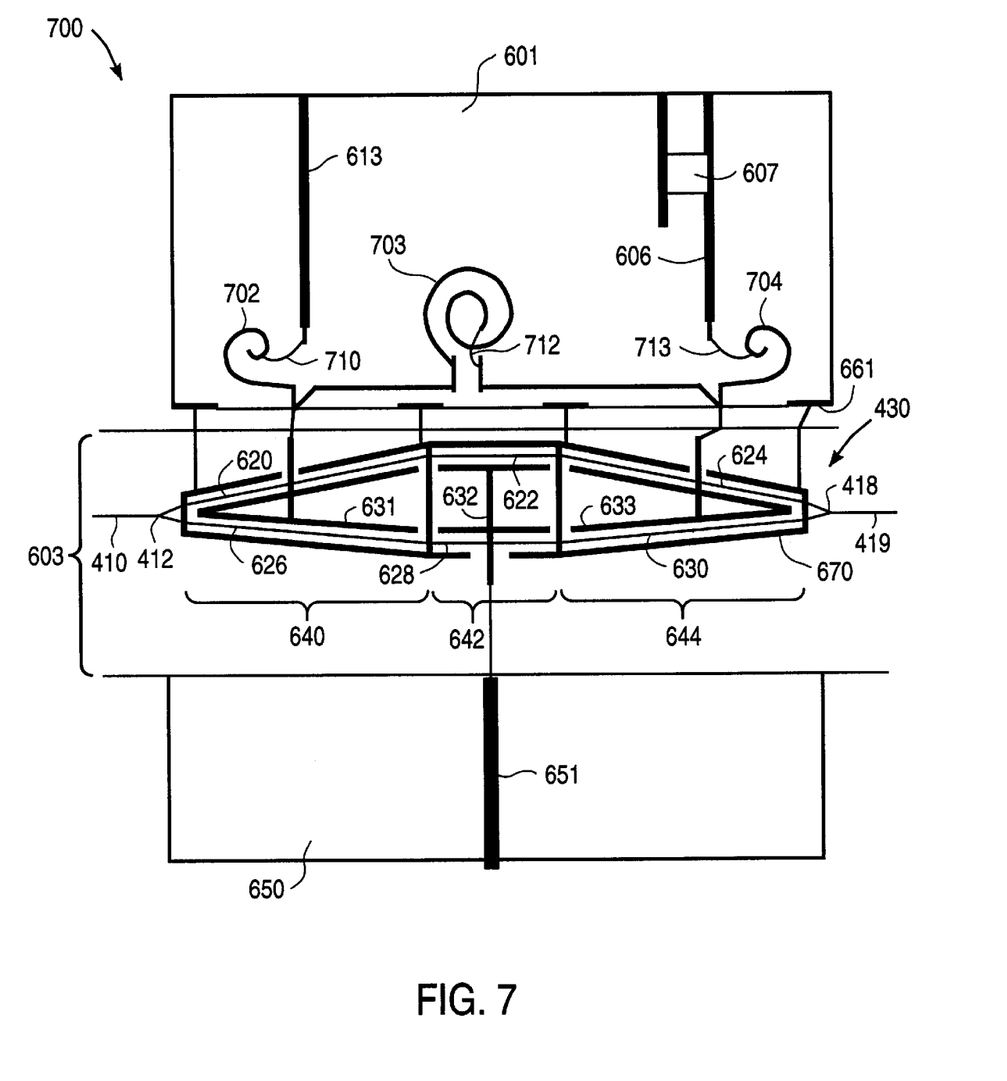

Referring now to FIG. 7, there is illustrated another optic modulator 700 according to an embodiment of the present invention. The optic modulator 700 is similar to the optic modulator 600. However, unlike the optic modulator 600, the first printed circuit board 701, of the optic modulator 700, uses spiral high impedance transmission line stubs 702, 703, 704. The use of spiral shaped, high impedance transmission line stubs increases the effective inductance per unit length of the stubs as compare to straight stubs. This saves space on the printed circuit board 701 as compared to the embodiment illustrated in FIG. 6. With the increased inductance per unit length of the spiral transmission line stubs 702, 703, 704, a large tuning range is more easily accomplished as compared to when straight transmission line stubs are used.

It should be noted that the bond wires 650, 654, 668, 682 710, 713, and 713 used to couple the transmission stubs together can be used for adjusting the matching between the stubs.

As discussed above, linearization of optical modulators is of major importance for devices used for, e.g., analog transmission of cable television signals. Many known systems rely on electronic means for linearization which is readily achievable at bandwidths up to 500 MHz. However, electronic linearization beyond 500 MHz is difficult to obtain. The optical modulators of the present invention described above and illustrated, e.g., in FIGS. 5–7, are capable of bandwidths in excess of 500 MHz. Accordingly, there is a need for a linearization method that can be used with the modulators of the present invention and applied to signals of, e.g., 1 GHz and beyond. In order to achieve best linearization, a flat frequency response is required. Thus the optic modulators of the present invention which incorporate sloped waveguides and segmented electrodes are well suited to achieve good linearization even at high frequencies.

In accordance with various embodiments of the present invention, the linearization approach described in U.S. Pat. No. 5,148,503 and U.S. Pat. No. 5,249,243, which are hereby expressly incorporated by reference, are combined with the optic modulators of the present invention which incorporate sloped waveguides and segmented electrodes. The linearization approach described in the above cited patents relies on the cascade coupling of multiple optic modulators in a manner that contributes to maximizing the linearity of the signal output by the optic modulators that are cascaded together.

Figure 8:
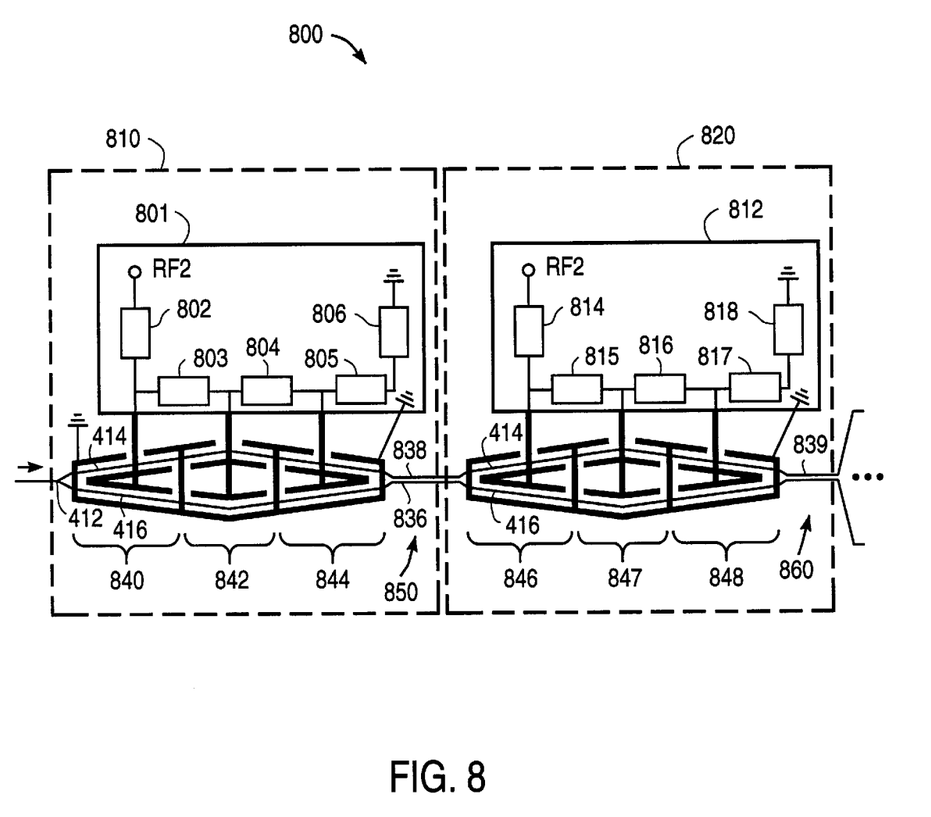
FIGS. 8 through 10 are pictorial diagrams illustrating various linearized optical modulators which include a plurality of optical modulators with sloped waveguides and multi-segmented electrodes coupled together.

Referring now to FIG. 8, there is illustrated a cascade coupling of optical modulators 810, 820 in a manner designed to increase the linearity of the signal output by the cascade coupling of the optic modulators 810, 820. As will be noted from a comparison of FIG. 8, and FIG. 5, the modulators 810, 820 are similar to the optic modulator previously described in regard to FIG. 5. That is, both the first and second optic modulators 810, 820 use sloped waveguides and a segmented electrode arrangement. As illustrated, both modulators 810 and 820 include printed circuit boards 801, 812 having a plurality of first, second, third, and fourth inductors (802, 803, 804, 805) and (814, 816, 817) respectively, and a terminating impedance 806, 819, respectively. It should be noted that the inductance and terminating impedance's of the first and second modulators 810, 820 may have different values. However, for good linearization over the operating frequency band it is important that the two modulators 820, 830 be as identical as possible.

The electrode and waveguide structures of the modulators 810 and 820 are implemented using three electrode segments (840, 842, 844) (846, 847, 848) Because of the similarity of the modulators 810, 820 to that of the modulator 500 of FIG. 5, the modulators 810, 820 will not be described in any further detail except in regard to the differences between the modulators 810, 820 and the modulator 500.

As illustrated in FIG. 8, the input waveguide of the modulator 810 includes a Y-branch waveguide coupler 412 as does the modulator 500. However, in order to implement a cascade coupling of multiple modulators 810, 820 in accordance with the present invention, a Y-branch waveguide segment is not used at the output of the modulator 810. Instead, a interferometric coupler structure of the type illustrated in FIG. 8 is used.

The first coupler 850 comprises an upper waveguide segment 838 and a lower waveguide segment 836. The upper waveguide segment 838 is coupled to the upper longitudinal waveguide segment 414 of the first modulator 810 and the upper longitudinal waveguide segment 414 of the second modulator 820 thereby forming a continuous waveguide structure between the upper longitudinal waveguide segments 414 of the first and second modulators 802, 810. A lower waveguide segment 836 of the coupler 850 is used to couple the lower longitudinal waveguide segments 416 of the first and second modulators 810, 820 together.

During operation, a portion of the light traveling through the lower horizontal waveguide segment 836 ideally has half of its light energy coupled into the upper waveguide segment 838. The remaining light from the lower waveguide segment 836 then travels into the lower longitudinal waveguide segment 416 of the second modulator 820. The light passes through the upper and lower longitudinal waveguide segments 414, 416 and into the second coupler 860 which operates in the same manner as the first coupler 850. The light output from the upper waveguide segment 839 of the second coupler 860 represents the linearized light output of the cascaded modulators 810, 820.

During operation, the amplitude of the modulating voltage applied to each stage and the level of the DC bias applied to each stage is adjusted for increasing the linearity of the modulated light output signal.

The linearization of the light output signal is obtained using a cascade coupling of the two optic modulators 810, 820 connected to RF signals RF1 and RF2, respectively. For proper operation the ratio of RF1/RF2 should be optimally adjusted, and the first and second waveguide coupling 850, 860 at the output of the modulators 810, 820 should be in a certain range. The proper ratio for RF1/RF2 and proper output ranges of the modulators 810, 820 are the same as or similar to those discussed in U.S. Pat. No. 5,148,503.

Figure 9:
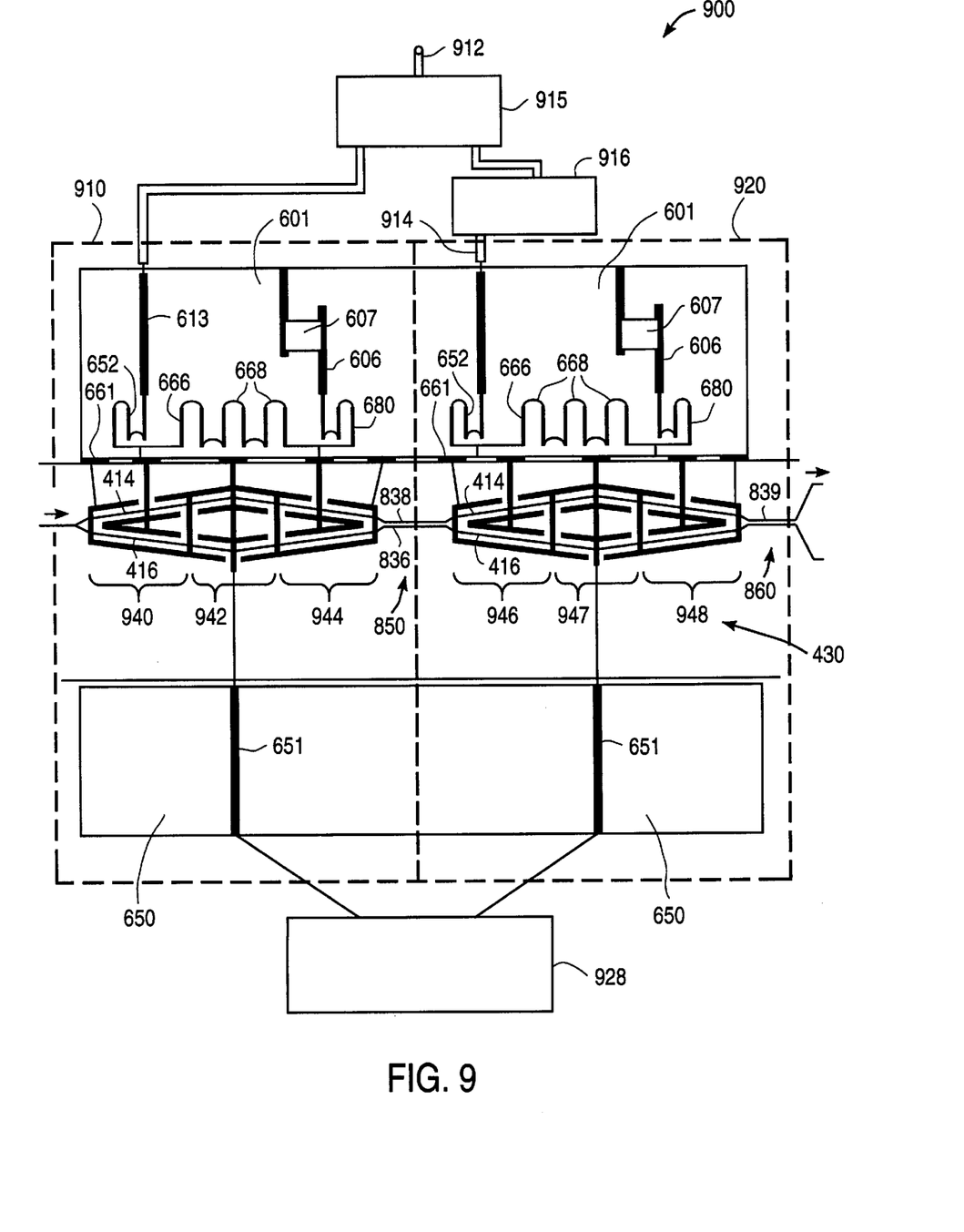

Referring now to FIG. 9, there is illustrated another embodiment of the present invention wherein a plurality of optic modulators 910, 920 are coupled together in a cascade arrangement in order to provide a linearized light output signal. The optic modulators 910, 920 are similar in design to the modulator 600 described in regard to FIG. 6. The modulators 910, 920 each include two modulating electrode segments 940, 944 and a bias electrode segment 947. Unlike the embodiment illustrated in FIG. 6, in the FIG. 9 embodiment, the bias electrode segment 947 includes sloped waveguides and sloped electrodes.

The optic modulators 910, 920 are coupled together in a cascade arrangement in the same manner as the optic modulators 810, 820 illustrated in FIG. 8.

In the FIG. 9 embodiment, an RF signal is supplied to an RF input 912 which is coupled to an RF power splitter 915. The RF power splitter 915, in turn, is coupled to the RF input of the first modulator 910 and to an input of an adjustable attenuator having, e.g., a resolution of 0.1 dB or better. During use, the adjustable attenuator is adjusted for optimal linearization. An output of the adjustable attenuator 916 is coupled to the RF input of the second modulator 920. With regard to the DC bias signal, a bias adjustment circuit 928 is used to supply a bias signal to the bias transmission lines 651 of the first and second modulators 910, 920.

Using the cascade coupling arrangement illustrated in FIG. 9, linearization may be achieved at frequencies well above 1 Ghz.

As discussed previously, the use of high impedance microwave transmission line stubs for external matching rather than discrete inductors offers superior reliability and reproducibility than does the use of discrete inductors. The effective inductance may be adjusted by the length and positioning of the bondwires used to connect the transmission line stubs.

Figure 10:
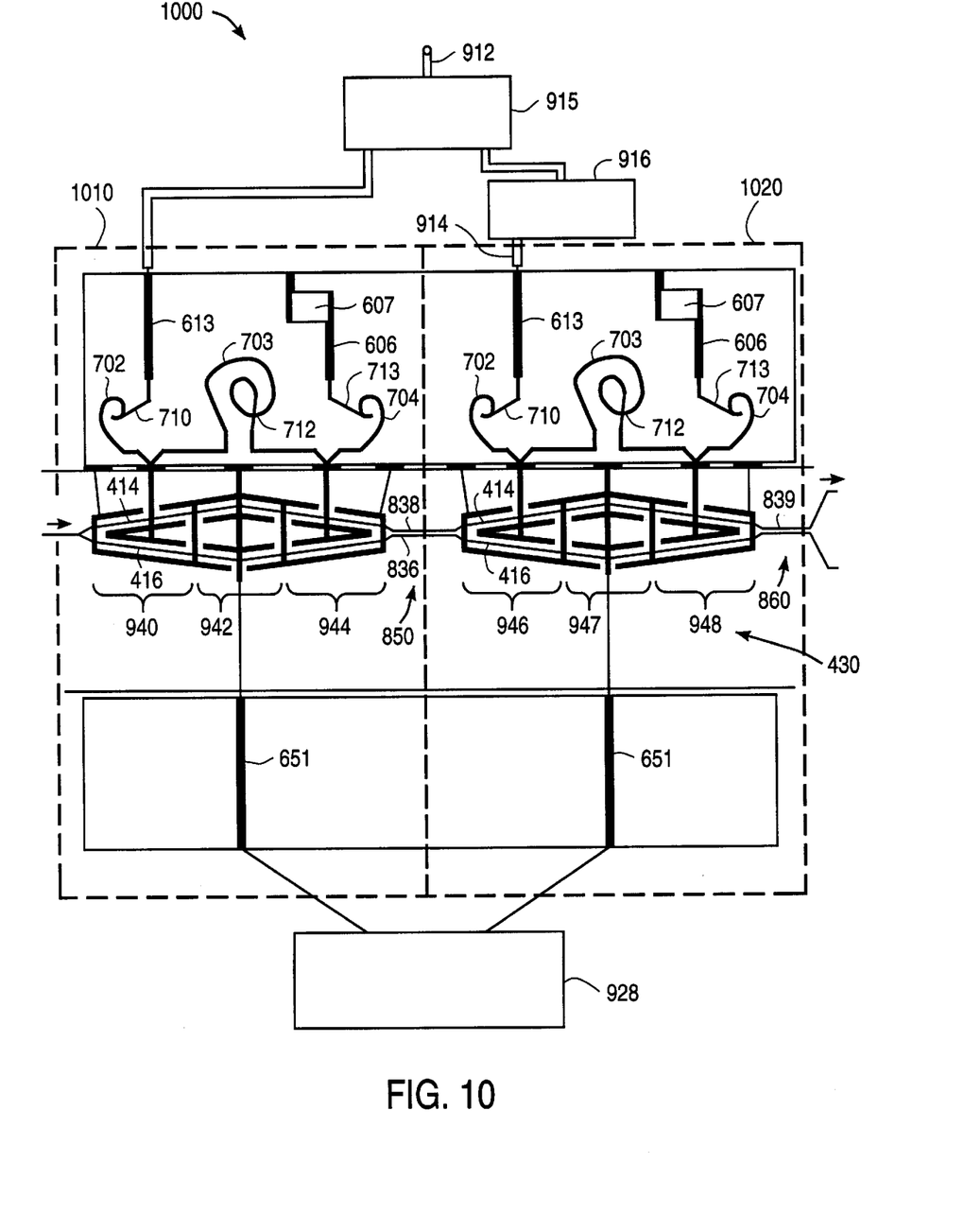

Referring now to FIG. 10, there is illustrated yet another embodiment of the present invention wherein a plurality of optic modulators 1010, 1020 are coupled together in a cascade arrangement in order to provide a linearized light output signal. The optic modulators 1010, 1020 are similar to the modulators 910 and 920 but use spiral transmission lines to reduce the amount of space required to implement the modulating circuit boards. Accordingly, the details of the modulators 1010, 1020 will not be discussed in any further detail except to note that elements in FIGS. 9 and 10 which bear the same reference numerals as element of other figures are intended to refer to the same or similar elements.

While the above described embodiment of the present invention are frequently described using examples of segmented electrodes having three segments, it is to be noted that the teaching of the present invention may be applied to modulators having any number of segments. Furthermore, any number of modulators may be coupled together in accordance with the above described approach to provide a linearized light output from the cascaded modulators.

What is claimed is:

1. An electro-optic modulator for providing a linearly modulated light signal, comprising:
   a substrate of an electro-optic material;
   a plurality of interferometric electro-optic modulators formed on said substrate and coupled in cascade, each of the plurality of electro-optic modulators including,
   i. a pair of first and second waveguide segments formed in said substrate and extending substantially coextensively with one another in a longitudinal direction, the first and second waveguide segments being separated by a transverse distance that gradually varies along a substantial portion of the course of the first and second waveguide segments;
   ii. an outer electrode assembly, substantially surrounding the first and second waveguide segments, the outer electrode assembly including a plurality of outer electrode segments, the plurality of outer electrode segments forming a plurality of n compartments through which the pair of first and second waveguide segments extend; and
   iii. a plurality of n inner electrode assemblies, one of the n inner electrode assemblies being located in each one of the n compartments, at least a portion of each one of the inner electrode assemblies being positioned between the portion of the first and second waveguide segments which extends through the compartment in which the one of the inner electrode assemblies is located;
   a modulating voltage source coupled to a first set of the inner electrode assemblies of each of the plurality of electro-optic modulators;
   a direct current bias voltage source coupled to at least one of the inner electrode assemblies of each of the plurality of electro-optic modulators;
   a first one in a chain of said cascaded electro-optic modulators further including an input waveguide coupler means for receiving an input light signal;
   a last one in the chain of said cascaded electro-optic modulators further including an output waveguide coupler means for providing a modulated light output signal; and
   means for controlling the bias voltage supplied by the direct current bias source to the inner electrode assemblies such that the bias voltage supplied to the inner electrode assemblies are maintained at predetermined levels for maximizing the linearity of the modulated light output signal.

2. The electro-optic modulator of claim 1, further comprising:
   means for adjusting the modulating voltages supplied to the plurality of inner electrode assemblies to maximize the linearity of the modulated light output signal.

3. The electro-optic modulator of claim 1, wherein the input waveguide coupler means for receiving an input light signal is a Y-branch type interferometric modulator.

4. The electro-optic modulator of claim 3, wherein the modulating voltage source includes:
   a modulating voltage signal input;
   a plurality of transmission line stubs coupled together in series; and
   a terminating impedance coupled to the plurality of transmission line stubs.

5. The electro-optic modulator of claim 4, wherein the plurality of transmission line stubs are coupled together using bondwires.

6. The electro-optic modulator of claim 5, wherein the transmission line stubs are spiral transmission line stubs.

7. The electro-optic modulator of claim 3, wherein each of the inner electrode assemblies is a solid electrode.

8. The electro-optic modulator of claim 3, wherein each of the inner electrode assemblies includes a plurality of electrode segments coupled together.

9. The electro-optic modulator of claim 1, wherein one of said plurality of modulators includes:
   a Y-branch type interferometric modulator serving as an input stage; and
   a 2×1 coupler switch type interferometric modulator serving as an output stage.

10. The electro-optic modulator of claim 9,
    wherein said 2×1 modulator includes a coupler type input waveguide configured in a manner for maximizing the linearity of the modulated light output signal.

11. The electro-optic modulator of claim 1, wherein the distance between the first and second waveguide segments is at a maximum near the center of each of the plurality of electro-optic modulators.

12. The electro-optic modulator of claim 11, wherein each one of the inner electrode assemblies includes:
    first and second inner elongated electrode segments extending in the longitudinal direction of the pair of first and second waveguide segments, the first and second inner elongated electrode segments being separated from each other along at least a portion of their length.

13. The electro-optic modulator of claim 12, wherein each of the first and second inner electrode segments is contoured to follow the shape of the first and second waveguide segments, respectively.

14. The electro-optic modulator of claim 12, wherein each one of the inner electrode assemblies further includes:

an inner connecting electrode segment extending in a direction transverse to the longitudinal direction of the pair of first and second waveguide segments.

15. The electro-optic modulator of claim 14, wherein the outer electrode assembly and the inner electrode assemblies are formed by depositing an electrode material on the substrate.

* * * * *